US011207778B2

(12) United States Patent
Hazan (10) Patent No.: US 11,207,778 B2
(45) Date of Patent: Dec. 28, 2021

(54) METHOD AND SYSTEM FOR DETERMINING JOINT VALUES OF AN EXTERNAL AXIS IN ROBOT MANUFACTURING

(71) Applicant: SIEMENS INDUSTRY SOFTWARE LTD., Tel Aviv (IL)

(72) Inventor: Moshe Hazan, Elad (IL)

(73) Assignee: Siemens Industry Software Ltd., Tel Aviv (IL)

(*) Notice: Subject to any disclaimer, the term of this patent is extended or adjusted under 35 U.S.C. 154(b) by 287 days.

(21) Appl. No.: 16/487,192

(22) PCT Filed: Jun. 30, 2017

(86) PCT No.: PCT/IB2017/000811
§ 371 (c)(1),
(2) Date: Aug. 20, 2019

(87) PCT Pub. No.: WO2019/002898
PCT Pub. Date: Jan. 3, 2019

(65) Prior Publication Data
US 2021/0129332 A1    May 6, 2021

(51) Int. Cl.
*B25J 9/16* (2006.01)
*G05B 19/418* (2006.01)

(52) U.S. Cl.
CPC .............. *B25J 9/1666* (2013.01); *B25J 9/163* (2013.01); *G05B 19/41815* (2013.01);
(Continued)

(58) Field of Classification Search
CPC ... B25J 9/1666; B25J 9/163; G05B 19/41815; G05B 2219/32333; G05B 2219/39101;
(Continued)

(56) References Cited

U.S. PATENT DOCUMENTS

2011/0153080 A1* 6/2011 Shapiro .................. B25J 9/1666
700/255
2015/0278406 A1   10/2015 Embon et al.
2016/0034613 A1   2/2016 Hazan et al.

OTHER PUBLICATIONS

Lounell B Gueta et al: "Practical Point-to-Point Multiple-Goal Task Realization in a Robot Arm with a Rotating Table", Advanced Robotics, VSP, Zeist, NL, vol. 25. No. 6-7, Jan. 1, 2011 (Jan. 1, 2011), pp. 717-738, XP008166882, ISSN: 0169-1864, DOI:10.1163/016918611X563274 [retrieved on Apr. 2, 2012].

(Continued)

*Primary Examiner* — Basil T. Jos
(74) *Attorney, Agent, or Firm* — Laurence A. Greenberg; Werner H. Sterner; Ralph E. Locher (57) ABSTRACT

Systems and a method determine a sequence of joint values of an external axis along a sequence of targets. Inputs are received, including robot representation, tool representation, sequence of targets, kinematics of the axis joints, and/or type of robot-axis motion. For each target, it is generated at least one weight factor table representing, for each available configuration of the axis joint motion, a combined effort of the robot motion and the axis motion depending on the type of combined robot-axis motion. Valid weight factor values of the table are determined by simulating collision free trajectories for reaching the target. The sequence of joint values of the at least one external axis is determined by finding from the weight factor table a sequence of joint values for which the sum of their corresponding weight factors for reaching the target location sequence is minimized.

20 Claims, 4 Drawing Sheets

(52) U.S. Cl.
CPC ............. *G05B 2219/32333* (2013.01); *G05B 2219/39101* (2013.01); *G05B 2219/40515* (2013.01); *G05B 2219/49143* (2013.01)

(58) Field of Classification Search
CPC ........... G05B 2219/40515; G05B 2219/49143; G05B 2219/39102; Y02P 90/02
See application file for complete search history.

(56) References Cited

OTHER PUBLICATIONS

Theodor Borangiu et al: "Heuristic 1-20 solution for constrained 7-DOF motion planning in 3D scanning application", Control Engineering Practice, Pergamon Press, Oxford, GB, vol. 20. No. 2. Jul. 18, 2011 (Jul. 18, 2011), pp. 93-101, XP028393098, ISSN: 0967-0661. DOI: 10.1016/J.CONENGPRAC.2011.07.008 [retrieved on Jul. 22, 2011].

Huang Yanjiang et al: "Motion Planning of Robot Arm with Rotating Table for a Multiple-Goal Task", Aug. 1, 2015 (Aug. 1, 2015),12th European Conference on Computer Vision, ECCV 2012, [Lecture Notes in Computer Science], pp. 571-580, XP047552018, ISSN: 0302-9743, ISBN: 978-3-642-04427-4.

* cited by examiner

METHOD AND SYSTEM FOR DETERMINING JOINT VALUES OF AN EXTERNAL AXIS IN ROBOT MANUFACTURING

TECHNICAL FIELD

The present disclosure is directed, in general, to computer-aided design, visualization, and manufacturing ("CAD") systems, product lifecycle management ("PLM") systems, product data management ("PDM") systems, and similar systems, that manage data for products and other items (collectively, "Product Data Management" systems or PDM systems). More specifically, the disclosure is directed to production environment simulation.

BACKGROUND OF THE DISCLOSURE

In industrial manufacturing, one or more external axes are often used during the interaction between industrial robots and parts to be machined by tools.

For example, there are external axes that are moving a robot base to a place so that the tool is able to perform some manufacturing operations by reaching the predefined target locations on parts to be machined. Examples of such external axes include, but are not limited to, rails and conveyors.

Other examples of external axes are the ones moving the part to be machined to a place so that the tool is able to reach some specific targets on the part. Examples of such external axes include, but are not limited to, manipulators and rotating/turn tables.

Examples of robotic manufacturing operations performed by tools include, but are not limited to, welding, spot welding, arc welding, painting, coating, drilling and riveting, laser cutting, hemming, and other types of manufacturing operation tasks performed by tools in robotic manufacturing.

In embodiments, the tool is preferably mounted on the robot. In other embodiments, the tool is on a fixed location and the robot holds the part through a gripper for enabling interaction between the part and the tool, e.g., the robot moves the part forward into the tool gun performing welding on the targets.

Figure 2:
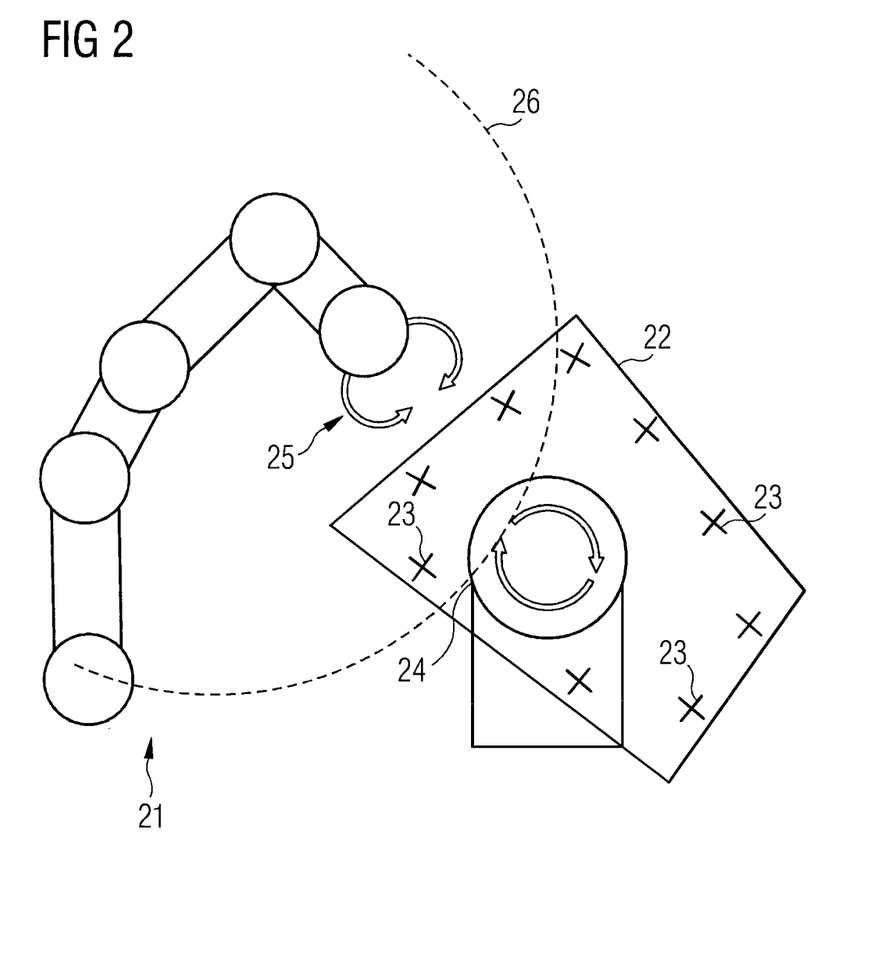
FIG. 2 schematically illustrates a drawing of an exemplary case scenario of a robot and an external axis in the form of a rotating table.

FIG. 2 schematically illustrates a drawing of an exemplary case scenario of a robot interacting with a rotating table as external axis.

The robot 21 is required to perform some manufacturing operations, e.g. some welding operations, via its mounted tool 25 on target locations 23 on a part 22 to be machined. The reachability area 26 of the robot is limited to the dashed zone and, without the presence of the rotating table 24, the robot tool 25 would not be able to reach all the targets 23 on the part 22.

In regular target reachability problems of industrial robots without external axes, it is assumed that the robot base is at a fixed position and that also the part to be machined is at a fixed position.

In industrial scenarios where at least one external axis is present, as for example in the schematic illustration of FIG. 2, target reachability optimization problems are more complex to be solved because the robot base and/or the part are not at a fixed position but are able to move via the external axis.

Unfortunately, problems are even more critical when the solutions to be determined are required to be collision free and efficient. Efficiency may be obtained by minimizing weight factors based on production cycle time, energy consumption, movements, other relevant weight factors, and any combination thereof.

Production cycle time is a critical factor, since each station is required to complete its robotic task in a very limited time frame. Energy efficient solutions are desirable for cost and environmental reasons.

In order to solve such reachability problems and determine joint values of external axes, currently state of the art techniques typically rely on expert users who make use of manual "trial-and error" approaches. Unfortunately, such known techniques often provide reachable solutions that are inefficient and sometimes not collision-free. Therefore, improved techniques are desirable.

SUMMARY OF THE DISCLOSURE

Various disclosed embodiments include methods and corresponding systems and computer readable mediums for determining a sequence of joint values of at least one external axis along a sequence of target locations whereby robotic tasks are to be sequentially performed by a tool and a robot, whereby the joint motion of the at least one external axis enables the tool to reach at least one of the target locations. A method includes receiving information inputs including virtual representation of the robot, virtual representation of the tool, information on the sequence of target locations, kinematic information on the joints of the least one external axis, information on the motion type between the robot and the at least one external axis. The methods includes generating, for each target location, at least one weight factor table representing, for each available configuration of the axis joint motion, a combined effort of the robot motion and the axis motion depending on the type of combined motion between the robot and the external axis. Valid weight factor values of the at least one weight factor table are determined by simulating collision free trajectories during the motion of the robot and the external axis enabling the tool to reach the target location sequence. The sequence of joint values of the at least one external axis is determined by finding from the weight factor table a sequence of joint values for which the sum of their corresponding weight factors for the tool to reach the target location sequence is minimized.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Previous techniques for determining joint values of external axes based on a manual "trial-and-error" approach are cumbersome, tedious, error-prone, and otherwise ill-suited for the task.

Previous techniques for determining joint values of external axes require too much time and effort.

Previous techniques for determining joint values of external axes based on a local approach where optimal joint values of external axes are searched from each target location point of view are sub-optimal and cause redundant and inefficient movement of the joints with increased efforts.

Embodiments determine in an automatic manner the sequence of joint values of an external axis that enable collision free motions.

Embodiments determine in an automatic manner the sequence of joint values of an external axis that are efficient in terms of employed efforts.

Embodiments reduce efforts during operation, e.g. by reducing cycle time, energy consumption, joint movements, and/or any combination thereof.

Embodiments enable simulation, preferably by Realistic Robot Simulation ("RRS"), and thus provide a collision-free solution.

Embodiments provide a fast solution with a reduced number of calculations.

Embodiments provide a solution in a three-dimensional virtual environment without employing real physical robots causing production delays.

Figure 1:
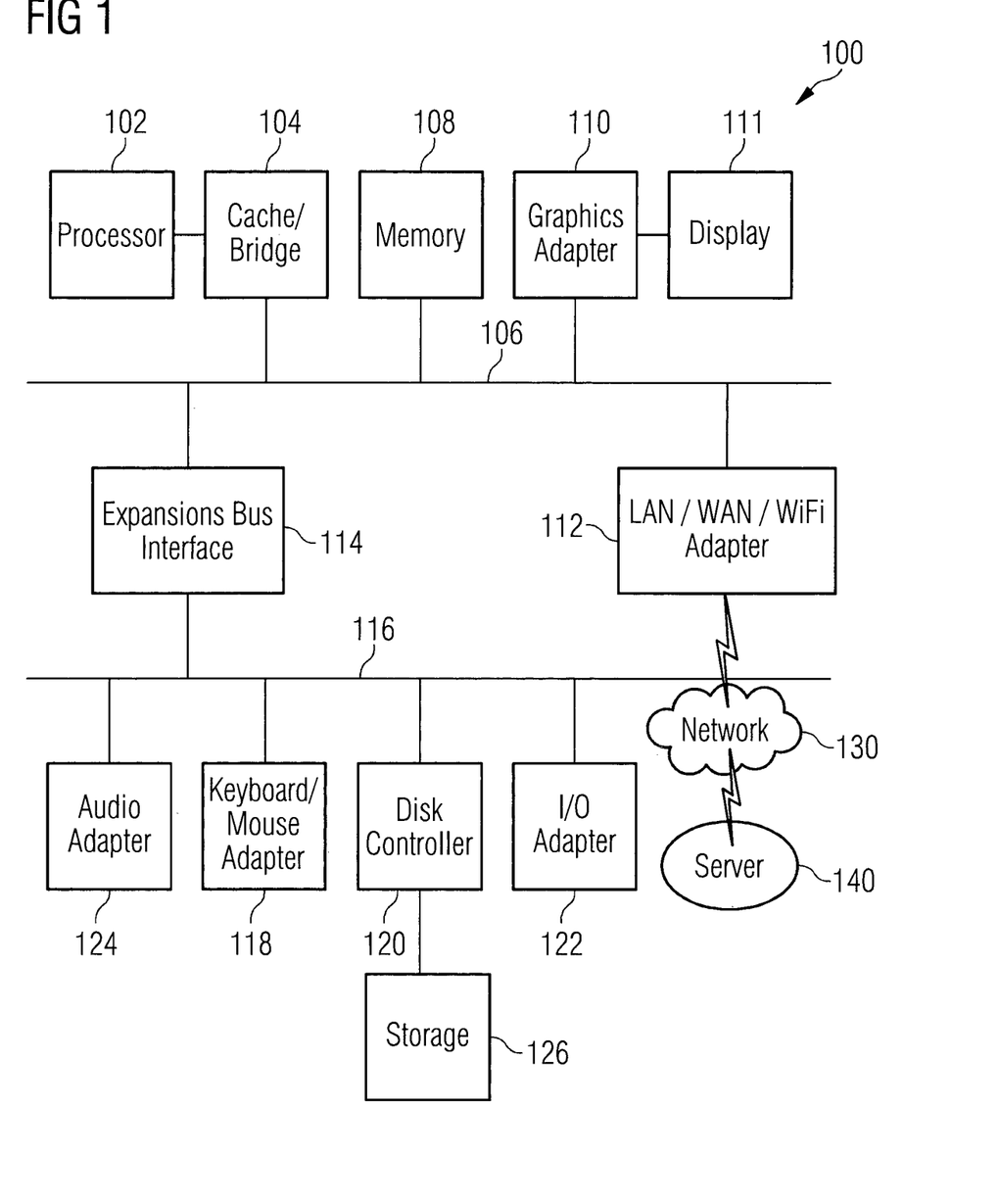
FIG. 1 illustrates a block diagram of a data processing system in which an embodiment can be implemented.

FIG. 1 illustrates a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 illustrated can include a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure can include an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Algorithm Steps for an Exemplary Embodiment/Case of One Axis x

In an exemplary embodiment, below are illustrated the algorithm steps for determining the N joint values $X_1, \ldots, X_N$ of an external axis x, so that a tool mounted on a robot reaches a sequence of P target locations, with $Z_1, \ldots, Z_P$ denoting the P target locations.

Assume, for illustration purposes, that this exemplary embodiment refers to the scenario of FIG. 2 where the joint values $X_1, \ldots, X_N$ are the values of the rotating angles of rotating table 24 enabling the robot 21 to reach the sequence of Z target locations 23 on the part 22 to be machined with the robot welding tool 25.

Algorithm Step I): Reception of Inputs

Information inputs are received, including: information on the three-dimensional ("3D") study environment of the cell layout (e.g. parts, equipment, fences and other cell information), information on the sequence of target locations, information on the robot and information on the robot tool, information on the external axis and information on the axis joints. Information on the axis joints include, but it is not limited to, minimum value, maximum value, step size, motion type (e.g. synchronized or parallel motion and unsynchronized or serial motion) and other relevant axis joint information.

Algorithm Step II): Generation of Cached Tables

For each target location Z that the robot tool 25 is required to reach, a weight factor table is generated, see exemplary Table 1, also called cached table to denote the cached information that is stored via the table.

TABLE 1

| From | To | | | | |
|---|---|---|---|---|---|
| | $X_1$ | $X_2$ | $X_3$ | ... | $X_N$ |
| $X_1$ | $T_{1,1}$ | $T_{1,2}$ | $T_{1,3}$ | T ... | $T_{1,N}$ |
| $X_2$ | $T_{2,1}$ | $T_{2,2}$ | $T_{2,3}$ | T ... | $T_{2,N}$ |
| $X_3$ | $T_{3,1}$ | $T_{3,2}$ | $T_{3,3}$ | T ... | $T_{3,N}$ |
| ... | T ... | T ... | T ... | T ... | T ... |
| $X_N$ | $T_{N,1}$ | $T_{N,2}$ | $T_{N,3}$ | T ... | $T_{N,N}$ |

In Table 1, $X_1, \ldots, X_N$ are the N joint values of the external axis x, starting from the given minimum value and reaching the given maximum value with the given steps size, i.e. $X_{i+1}$ is $X_i$+the given step size. In Table 1, $T_{i,j}$ is the weight factor representing the combined effort of the robot and of the external axis to move from target location Z-1 with an external joint value $X_i$ forward to location Z with an external joint value $X_j$.

In this example embodiment, the combined effort $T_{i,j}$ is the time duration of the robot and of the external axis to move from target location Z-1 with an external joint value $X_i$ forward to location Z with an external joint value $X_j$. In other embodiments, the weight factor $T_{i,j}$ representing the effort may be based on cycle time, energy consumption, movements, other relevant industrial effort measures and any combination thereof.

In case the combined motion between the external axis and the robot is unsynchronized, also called "serial", $T_{i,j}$ is the time duration of the external axis motion plus time duration of the robot motion. In case the combined motion between the axis and the robot is synchronized, also called "parallel", $T_{i,j}$ is the time duration of the parallel moving of the robot and the external axis together.

In embodiments, the time duration value $T_{i,j}$ is measured via simulation techniques, e.g. via RRS simulation. In case the robot cannot reach the target location, the returned $T_{i,j}$ value is Not Applicable ("N/A"). Also in case the robot reaches the location but there is a collision, the returned $T_{i,j}$ value is N/A.

Table 2 below is an example of weight factor or cached table for the first target location Z=1.

TABLE 2

| | $X_1$ | $X_2$ | $X_3$ | ... | $X_N$ |
|---|---|---|---|---|---|
| start | $T_{1,1}$ | $T_{1,2}$ | $T_{1,3}$ | ... | $T_{1,N}$ |

For each of the P target locations, P cached tables are generated.

Algorithm Step III): Finding the Optimal Solution

For all the P generated cached tables, an optimization algorithm is executed to find the optimal solution minimizing the sum of the weight factors.

The found optimal solution is then applied to determine the sequence of joint values of the external axis by setting on each target location the value of the external axis corresponding to the found optimal solution.

Examples of optimization algorithms include, but are not limited to, simulated annealing algorithms, stochastic algorithms, genetic algorithms, and any other suitable types of optimization algorithms.

In embodiments, initial perturbation/combination for the optimization algorithm may be a forward or backward local solution. In embodiments, a random initial combination may be selected.

The forward local solution is found by going over the P tables starting from location $Z_1$ until location $Z_P$. For the first table for location $Z_1$, i.e. Table 2, the lowest weigh factor $T_{i,j}$ is selected. Then, for any other table, the lowest $T_{i,j}$ is selected only from the relevant row. For example, if from the first table the lowest $T_{i,j}$ is $T_{1,3}$, in the following table the lowest weight factor from row 3 is selected and so on.

Similarly, the backward local solution is found by going over the P tables starting from location $Z_P$ until location $Z_1$. For the first table for location $Z_P$, the lowest weigh factor $T_{i,j}$ is selected. Then, for any other table, the lowest $T_{i,j}$ is selected only from the relevant column. For example, if from the first table the lowest $T_{i,j}$ is $T_{2,6}$, in the following table the lowest weight factor from column 2 is selected and so on.

Tables 3-6 below illustrate a numerical example for finding the local forward and back solutions. On the first row and first column of Tables 3-6 are the possible joint values of the external axis (i.e. 10, 20, 30, 40, 50, step size 10, minimum value 10, maximum value 50, representing e.g. angles of the rotating table). In the cells of Table 3-6 are the weight factor values measuring the duration time of the motion of the rotating table 24 and the robot 21 to reach the four Z=1,2,3,4 target locations 23 assuming unsynchronized motion between the axis 24 and the robot 21.

TABLE 3 for location Z = 1

| From | To | | | | |
|---|---|---|---|---|---|
|  | 10 | 20 | 30 | 40 | 50 |
| 10 | 1.1 | 1.5 | 1.7 | 1.8 | 2 |

TABLE 4 for location Z = 2

| From | To | | | | |
|---|---|---|---|---|---|
|  | 10 | 20 | 30 | 40 | 50 |
| 10 | 1.3 | 1.4 | 0.4 | 0.3 | 1.5 |
| 20 | 0.1 | 0.3 | 0.2 | 0.4 | 0.23 |
| 30 | 0.3 | 1 | 0.2 | 0.2 | 1.3 |
| 40 | 0.2 | 1.2 | 0.32 | 0.03 | 0.5 |
| 50 | 0.5 | 0.8 | 0.1 | 0.8 | 0.55 |

TABLE 5 for location Z = 3

| From | To | | | | |
|---|---|---|---|---|---|
|  | 10 | 20 | 30 | 40 | 50 |
| 10 | 0.3 | 1 | 0.46 | 1.3 | 1.8 |
| 20 | 0.4 | 0.6 | 0.25 | 0.1 | 0.22 |
| 30 | 0.2 | 1.1 | 0.7 | 0.3 | 1.38 |
| 40 | 0.03 | 0.3 | 0.3 | 0.2 | 0.57 |
| 50 | 0.8 | 0.85 | 0.18 | 0.23 | 0.58 |

TABLE 6 for location Z = 4

| From | To | | | | |
|---|---|---|---|---|---|
|  | 10 | 20 | 30 | 40 | 50 |
| 10 | 0.67 | 1.3 | 0.61 | 1.13 | 0.8 |
| 20 | 0.45 | 0.7 | 0.5 | 0.1 | 0.2 |
| 30 | 0.27 | 1.15 | 0.77 | 0.33 | 1.83 |
| 40 | 0.73 | 0.35 | 0.37 | 0.42 | 0.72 |
| 50 | 0.28 | 0.88 | 0.8 | 0.2 | 0.81 |

The forward local solution is: $Loc_{Z=1}(X=10) \rightarrow Loc_{Z=2}(X=40) \rightarrow Loc_{Z=3}(X=10) \rightarrow Loc_{Z=4}(X=30)$. The total time of the forward local solution is 1.1+0.3+0.03+0.61=2.04 sec.

The backward local solution is: $Loc_{Z=1}(X=40) \rightarrow Loc_{Z=2}(X=40) \rightarrow Loc_{Z=3}(X=20) \rightarrow Loc_{Z=4}(X=40)$. The total time of the backward local solution is 1.8+0.03+0.3+0.1=2.23 sec.

Departing from the above local solutions, a suitable optimization algorithm is executed to find the optimal solution. A suitable optimization algorithm works on the perturbation lists and evaluates them by taking into account the calculated weight factor tables.

Another example embodiment, with different numerical input values, is shown in Tables 7 and 8 below, illustrating an example of measuring the delta time from location to location, each cycle with different external axes values.

Table 7 shows an exemplary code input of an annealing algorithm with the three cached tables loc1, loc2, loc3. Table 8 shows the text of the output log file where the found optimal solution is the last row having the minimum total duration time of 0.88.

In Table 7, vector loc1 represents the cached table from location "Home" to location "loc1" with all possible value of external axis joints (i.e. 0, 1, 2, 3). In Table 7, vector loc2 represents the cached table from location loc1 to location loc2 with all possible value of external axis joints.

TABLE 7

**INPUT**

```
public void StartAnnealing( )
{
  ArrayList list = new ArrayList( );
  //For each Location there are 4 possible
  //external axis values allowing the robot to reach
  // each location there
  int[ ] current = {0, 1, 2, 3};
  //For loc1 these are the efforts to reach this
  //location FROM robot home position TO reach
  //loc1 with turn table j (1\2\3\4 value)
  double[ ] loc1 = {0.4, 0.5, 0.6, 0.45};
  //loc2[i,j] denotes the efforts for moving the robot FROM
  //loc1 with turn table i TO reach loc2 with turn table j
  double[,] loc2 = new double[,]   {{0.2, 0.25, 0.46, 0.34},
                                    {0.5, 0.7, 0.99, 0.43},
                                    {0.11, 0.24, 0.78, 0.23},
                                    {0.41, 0.21, 0.18,0.53}};
  //loc3[i,j] deotes the efforts for moving the robot FROM
  //loc2 with turn table i TO reach loc3 with turn table j
  double[,] loc3 = new double[,]   {{0.25, 0.65, 0.1, 1.1},
                                    {0.25, 0.17, 0.89, 0.23},
                                    {0.71, 0.4, 0.28, 0.24},
                                    {0.1, 0.8, 0.3, 0.76}};
```

TABLE 8

* OUTPUT LOG_FILE.TXT*

Loc1(0) Loc2(1) Loc3(2) => Time(0.4 +0.25+ 0.89= 1.54).
Loc1(2) Loc2(1) Loc3(0) => Time(0.6 +0.24+ 0.25= 1.09).
Loc1(3) Loc2(1) Loc3(0) => Time(0.45+0.21+ 0.25= 0.91).
Loc1(0) Loc2(1) Loc3(3) => Time(0.4 +0.25+ 0.23= 0.88).

Algorithm Steps for an Exemplary Embodiment/Case of Two Axes x,y

The above exemplary embodiments address the case scenario of one single external axis x, where, for each of the P target locations, only one cached table is generated.

Figure 3:
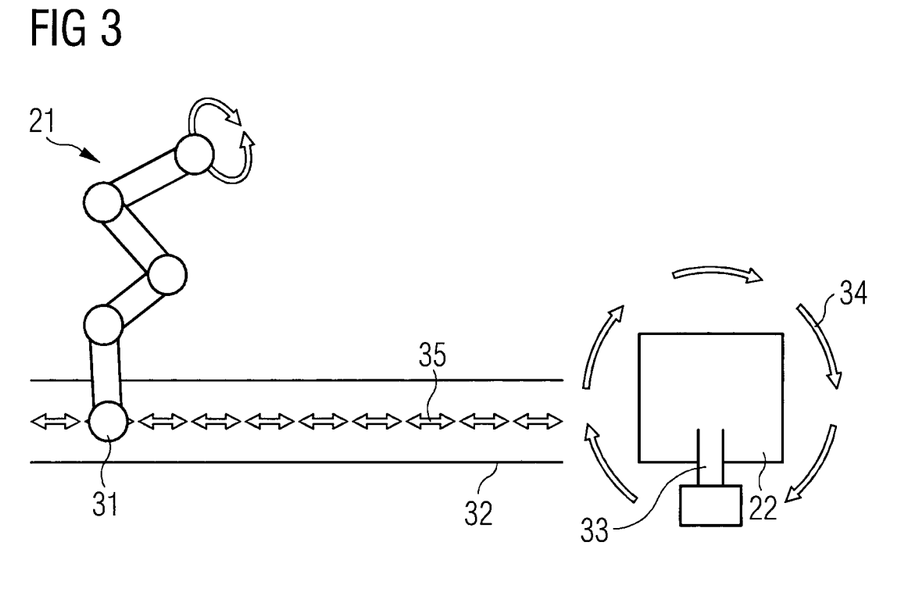
FIG. 3 schematically illustrates a drawing of a first exemplary case scenario of a robot with two external axes.
Figure 4:
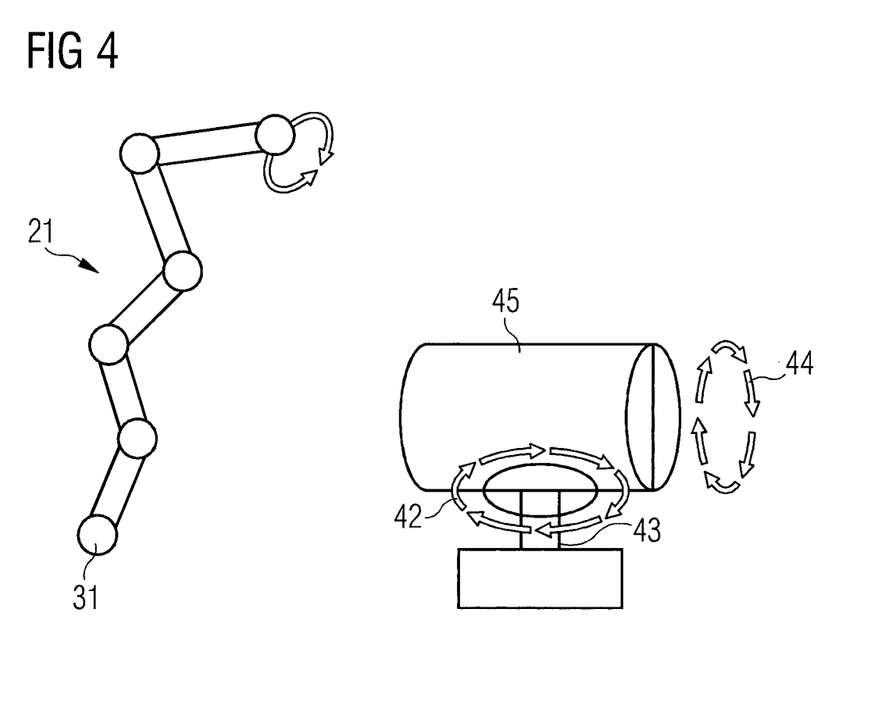
FIG. 4 schematically illustrates a drawing of a second exemplary case scenario of a robot with two external axes.

The below exemplary embodiment illustrates the case scenario of two external axes x,y. FIG. 3 and FIG. 4 illustrate respectively schematic drawings of a first and second exemplary case scenarios of a robot with two external axis.

In FIG. 3 there is the industrial robot 21 whose base 31 is moving along a moving rail 32 and a part 22 which is moved by a turn table 33. The two external axes x, y are the axis 35 of the moving rail 32 and the axis 34 of the turn table 33.

In FIG. 4 there is the industrial robot 21 whose base 31 is fixed and a part 45 which is moved by a rotating table 43 according to different external axes x,y 42, 44 of the turn table 43.

In the case scenario of one single axis, for each target location, a single cached table is generated, where table 9 below illustrates a generic representation of a cached table for location Z.

TABLE 9

| From | To | | | | |
|---|---|---|---|---|---|
|  | $X_1$ | $X_2$ | $X_3$ | ... | $X_N$ |
| $X_1$ | $T_{1,1}$ | $T_{1,2}$ | $T_{1,3}$ | T ... | $T_{1,N}$ |
| $X_2$ | $T_{2,1}$ | $T_{2,2}$ | $T_{2,3}$ | T ... | $T_{2,N}$ |
| $X_3$ | $T_{3,1}$ | $T_{3,2}$ | $T_{3,3}$ | T ... | $T_{3,N}$ |
| ... | T ... | T ... | T ... | T ... | T ... |
| $X_N$ | $T_{N,1}$ | $T_{N,2}$ | $T_{N,3}$ | T ... | $T_{N,N}$ |

In case of two axes, for each of the P target locations $Z_1, \ldots, Z_P$ several cached tables of type Table 9 above are generated. Denote with $X_1, \ldots, X_N$ the possible N joint values of axis x. Denote with $Y_1, \ldots, Y_M$ the possible M joint values of axis y.

For example, assume that the possible joint values of axis y are three, respectively 0, 10, 20. For each location Z, nine weight factor tables as the one of Table 9 are then generated. More specifically:
1. a cached table from Y=0 to Y=0,
2. a cached table from Y=0 to Y=10,
3. a cached table from Y=0 to Y=20,
4. a cached table from Y=10 to Y=0,
5. a cached table from Y=10 to Y=10,
6. a cached table from Y=10 to Y=20,
7. a cached table from Y=20 to Y=0,
8. a cached table from Y=20 to Y=10,
9. a cached table from Y=20 to Y=0.

In embodiments, first the asynchronized axis/axes is/are moved, and only then the robot with the synchronized axis/axes is moved.

Each external axis has its own input (e.g. maximum value, minimum value, step size, synchronized motion/asynchronized motion). In embodiments, the user can advantageously specify whether only one of the two axes is to be optimized and keep the other axis fixed at a predefined value.

So, in order to reach location Z, the robot should drive from location Z-1 forward to location Z. It will be done by moving the x axis from its previous value (for location Z-1) to its new value (for location Z)

For example:
Location Z-1 uses X=10
Location Z uses X=25
The axis will be moved from 10, by 15 units to be 25 and the robot joints will be moved as well.

In another example, there is HOME (X=0, Y=0), there are two location Loc1, Loc2, there are two values for X: 0, 10, there are two values for Y: 0, 10. All possible joint values from HOME, to Loc1 and to Loc2 are the following:
HOME->Loc1 (x=0, y=0)->Loc2(x=0, y=0)
HOME->Loc1 (x=0, y=0)->Loc2(x=10, y=0)
HOME->Loc1 (x=0, y=0)->Loc2(x=10, y=10)
HOME->Loc1 (x=0, y=0)->Loc2(x=0, y=10)
HOME->Loc1 (x=10, y=0)->Loc2(x=0, y=0)
HOME->Loc1 (x=10, y=0)->Loc2(x=10, y=0)
HOME->Loc1 (x=10, y=0)->Loc2(x=10, y=10)
HOME->Loc1 (x=10, y=0)->Loc2(x=0, y=10)
HOME->Loc1 (x=10, y=10)->Loc2(x=0, y=0)
HOME->Loc1 (x=10, y=10)->Loc2(x=10, y=0)
HOME->Loc1 (x=10, y=10)->Loc2(x=10, y=10)
HOME->Loc1 (x=10, y=10)->Loc2(x=0, y=10)
HOME->Loc1 (x=0, y=10)->Loc2(x=0, y=0)
HOME->Loc1 (x=0, y=10)->Loc2(x=10, y=0)
HOME->Loc1 (x=0, y=10)->Loc2(x=10, y=10)
HOME->Loc1 (x=0, y=10)->Loc2(x=0, y=10)

Figure 5:
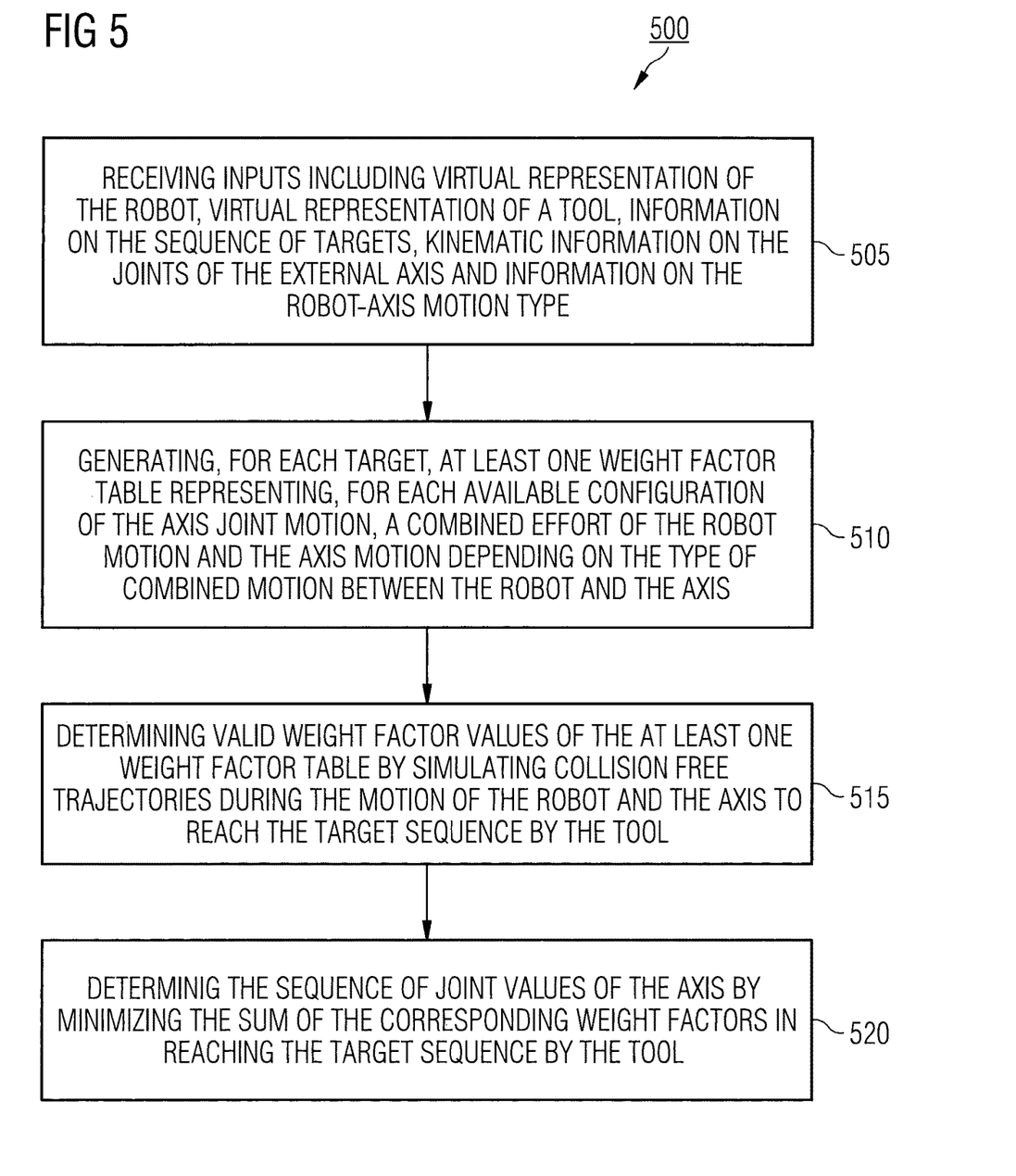
FIG. 5 illustrates a flowchart of a process for determining a sequence of joint values of an external axis along a sequence of targets in accordance with disclosed embodiments.

FIG. 5 illustrates a flowchart 500 of a method for determining a sequence of joint values of at least one external axis along a sequence of target locations in accordance with disclosed embodiments. Such method can be performed, for example, by system 100 of FIG. 1 described above, but the "system" in the process below can be any apparatus configured to perform a process as described. Along the sequence of locations, robotic tasks are to be sequentially performed by a tool and a robot, whereby the joint motion of the at least one external axis enables the tool to reach at least one of the targets.

At act 505, information inputs are received, including virtual representation of the robot, virtual representation of the tool, information on the sequence of targets, kinematic information on the joints of the external axis and information on the type of combined motion between the robot and the external axis. In embodiments, the information inputs further include a virtual representation of cell layout and/or virtual representation of the part. In embodiments, the kinematic information on the axis joints include, but is not limited to, minimum value, maximum value, step size, default kinematic settings, and, any combination thereof.

At act 510, it is generated, for each target, at least one weight factor table representing, for each available configuration of the axis joint motion, a combined effort of the robot motion and the axis motion depending on the type of combined motion between the robot and the external axis. In embodiments, the available configurations are the ones free from static collision. In embodiments, the robot-axis motion type is synchronized or asynchronized.

At act 515, valid weight factor values of the at least one weight factor table are determined by simulating collision free trajectories during the motion of the robot and the external axis enabling the tool to reach the target sequence. In embodiments, examples of weight factors include, but are not limited to: time duration, cycle time, energy consumption, joint movements for the simulated trajectory and any combination thereof.

At act 520, the sequence of joint values of the external axis is determined by finding from the weight factor table a sequence of joint values for which the sum of their corresponding weight factors for the tool to reach the target location sequence is minimized. In embodiments, the found joint value sequence is determined by performing an optimization algorithm. Examples of optimization algorithms include, but are not limited to, simulated annealing algorithms, stochastic algorithms and genetic algorithms. In embodiments, initial perturbation/combination for the optimization algorithm may be a forward or backward local solution or it may be randomly selected.

In embodiments, dynamic and/or static collision checks are done by taking into account the geometrical model of the cell, information on robots, and on robotic path.

In embodiments, in case a plurality of external axes are present, then a plurality of weight factor tables, for each target location, are determined at act 510 in accordance with the possible motion combinations of the plurality of the external axes.

One or more of the processor 102, the memory 108, and the program running on the processor 102 receive the inputs via one or more of the local system bus 106, the adapter 112, the network 130, the server 140, the interface 114, the I/O bus 116, the disk controller 120, the storage 126, and so on. Receiving, as used herein, can include retrieving from storage 126, receiving from another device or process, receiving via an interaction with a user, or otherwise.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method for determining, by a data processing system, a sequence of joint values of at least one external axis along a sequence of target locations whereby robotic tasks are to be sequentially performed by a tool and a robot, wherein an axis joint motion of the at least one external axis enables the tool to reach at least one of the target locations, which method comprises the following steps of:
   a) receiving information inputs including virtual representation of the robot, virtual representation of the tool, information on the sequence of target locations, kinematic information on joints of the least one external axis, information on a motion type between the robot and the at least one external axis;
   b) generating, for each target location, at least one weight factor table representing, for each available configuration of the axis joint motion, a combined effort of robot motion and the axis joint motion depending on a type of combined motion between the robot and the at least one external axis;
   c) determining valid weight factor values of at least one weight factor table by simulating collision free trajectories during a motion of the robot and the at least one external axis enabling the tool to reach the target location sequence; and
   d) determining a sequence of joint values of the at least one external axis by finding from the weight factor table the sequence of joint values for which a sum of corresponding weight factors for the tool to reach a target location sequence is minimized.

2. The method according to claim 1, wherein the sequence of joint values determined in step d) is found by performing an optimization algorithm.

3. The method according to claim 2, wherein the optimization algorithm is selected from the group consisting of:
   simulated annealing algorithms;
   stochastic algorithms; and
   genetic algorithms.

4. The method according to claim 1, wherein the information inputs of step a) further includes virtual representation of a cell layout and/or virtual representation of a part to be machined through robotic tasks.

5. The method according to claim 1, wherein external joint axis motion of weight factors duration table is determined in step b) and is checked to be free from static collision.

6. The method according to claim 1, wherein, in case a plurality of external axes are present, then a plurality of weight factor tables, for each target location, are determined in step b) in accordance with possible motion combinations of the plurality of the external axes.

7. The method according to claim 1, wherein a robot-axis motion type is synchronized or asynchronized.

8. The method according to claim 1, wherein a weight factor is selected from the group consisting of:
   time duration;
   cycle time;
   energy consumption;
   joint movements; and
   any combination of the above.

9. The method according to claim 1, wherein the kinematic information on the joints of the at least one external axis is selected from the group consisting of:
   a minimum value;
   a maximum value;
   a step size;
   default kinematic settings; and
   any combination of the above.

10. A data processing system, comprising:
    a processor;
    an accessible memory; and
    the data processing system configured to:
    a) receive information inputs including virtual representation of a robot, virtual representation of a tool, information on a sequence of target locations, kinematic information on joints of at least one external axis, information on a motion type between the robot and the at least one external axis;
    b) generate, for each target location, at least one weight factor table representing, for each available configuration of an axis joint motion, a combined effort of robot motion and the axis joint motion depending on a type of combined motion between the robot and the at least one external axis;
    c) determine valid weight factor values of the at least one weight factor table by simulating collision free trajectories during a motion of the robot and the at least one external axis enabling the tool to reach a target location sequence; and d) determine a sequence of joint values of the at least one external axis by finding from the weight factor table the sequence of joint values for which a sum of corresponding weight factors for the tool to reach the target location sequence is minimized.

11. The data processing system according to claim 10, wherein the sequence of joint values determined in step d) is found by performing an optimization algorithm.

12. The data processing system according to claim 10, wherein, in case a plurality of external axes are present, then a plurality of weight factor tables, for each target location, are determined in step b) in accordance with possible motion combinations of the plurality of external axes.

13. The data processing system according to claim 10, wherein a robot-axis motion type is synchronized or asynchronized.

14. The data processing system according to claim 10, wherein a weight factor is selected from the group consisting of:
   time duration;
   cycle time;
   energy consumption;
   joint movements; and
   any combination of the above.

15. The data processing system according to claim 10, wherein the kinematic information on the joints of the at least one external axis is selected from the group consisting of:
   a minimum value;
   a maximum value;
   a step size;
   default kinematic settings; and
   any combination of the above.

16. A non-transitory computer-readable medium encoded with executable instructions that, when executed, cause at least one data processing system to:
   a) receive information inputs including virtual representation of a robot, virtual representation of a tool, information on a sequence of target locations, kinematic information on joints of at least one external axis, information on a motion type between the robot and the at least one external axis;
   b) generate, for each target location, at least one weight factor table representing, for each available configuration of axis joint motion, a combined effort of robot motion and the axis joint motion depending on a type of combined motion between the robot and the at least one external axis;
   c) determine valid weight factor values of at least one weight factor table by simulating collision free trajectories during motion of the robot and the at least one external axis enabling the tool to reach a target location sequence; and
   d) determine a sequence of joint values of the at least one external axis by finding from the weight factor table a sequence of joint values for which a sum of corresponding weight factors for the tool to reach the target location sequence is minimized.

17. The non-transitory computer-readable medium according to claim 16, where the sequence of joint values determined in step d) is found by performing an optimization algorithm.

18. The non-transitory computer-readable medium according to claim 16, wherein, in case a plurality of external axes are present, then a plurality of weight factor tables, for each target location, are determined in step b) in accordance with possible motion combinations of the plurality of the external axes.

19. The non-transitory computer-readable medium according to claim 16, wherein a robot-axis motion type is synchronized or asynchronized.

20. The non-transitory computer-readable medium according to claim 16, wherein a weight factor is selected from the group consisting of:
   time duration;
   cycle time;
   energy consumption;
   joint movements; and
   any combination of the above.

* * * * *